United States Patent Office.

WILLIAM H. JACKSON, OF SALEM, MASSACHUSETTS.

Letters Patent No. 79,229, dated June 23, 1868.

IMPROVEMENT IN THE MANUFACTURE OF GUNPOWDER.

*The Schedule referred to in these Letters Patent and making part of the same.*

TO ALL WHOM IT MAY CONCERN:

Be it known that I, WILLIAM H. JACKSON, of Salem, in the county of Essex, and State of Massachusetts, have invented a new and improved Mode of Manufacturing Powder; and I do hereby declare that the following is a full and exact description thereof.

My invention has for its object the manufacture of powder to be used in fire-arms or cannon, and for blasting or mining purposes, by dissolving the whole or part of the ingredients of which it is to be composed, and by then evaporating such solutions, as hereinafter described, to obtain a homogeneous and powerfully explosive powder.

Powders for the above-mentioned purpose are at present made by grinding and pressing the ingredients together, with great danger to the workmen, and frequently with unsatisfactory results to the manufacturers.

To enable one skilled in the art to make use of my invention, I will proceed to describe the process of manufacture.

I have found that such powders are best made from highly-oxidized salts, such as chlorates or nitrates of potash, soda, or baryta, with some vegetable extract, such as gambia or logwood extract, and sulphur and carbon in some cases. I dissolve the chlorate or nitrate with the vegetable extract in sufficient cold or warm water to make a perfect solution, in an open pan or kettle, and immediately begin to evaporate by fire or steam-heat. While this solution is evaporating, I stir in sulphur, either in solution or as "brimstone," or as an insoluble compound, and, if desirable, I also add insoluble carbon during the evaporation. All the necessary ingredients having been added, I evaporate the whole to or nearly to dryness, with constant stirring; it is then passed through sieves of the requisite degree of fineness, and is ready for use or sale.

I do not confine myself to the exact kind of ingredients, nor to any specified proportions of the same, and I am aware that the materials mentioned above have been employed in the composition of powder; but it is my desire at present to secure this new mode of manufacture by solution and evaporation.

Powder made by my process has many advantages over any other, its cost is reduced, explosive power enhanced, the result is always sure and uniform, and the danger in handling is much lessened.

I am aware that gunpowder has been made by mixing pulverized sulphur, charcoal, and other combustible powders with solutions of saltpetre and of other salts containing oxygen, and then evaporating to dryness, and I do not claim such modes of procedure; but

What I claim, and desire to secure by Letters Patent of the United States, is—

The manufacture of gunpowder by mixing a solution of nitrate of potash, or a known equivalent thereof, with a soluble vegetable extract, such as extract of logwood, or with other soluble organic matter, and by subsequensly evaporating to dryness, with or without the addition of sulphur or of pulverized charcoal, substantially as hereinabove described.

W. H. JACKSON.

Witnesses:
WM. ANDREWS,
GEO. H. BUXTON.